(12) United States Patent
Sakaguchi (10) Patent No.: US 7,864,272 B2
(45) Date of Patent: Jan. 4, 2011

(54) SUBSTRATE FOR A REFLECTION TYPE LIQUID CRYSTAL DISPLAY APPARATUS, REFLECTION TYPE LIQUID CRYSTAL DISPLAY APPARATUS USING THE SAME, AND LIQUID CRYSTAL PROJECTOR APPARATUS USING THE SAME

(75) Inventor: Kiyofumi Sakaguchi, Miura-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 84 days.

(21) Appl. No.: 12/267,043

(22) Filed: Nov. 7, 2008

(65) Prior Publication Data

US 2009/0122209 A1    May 14, 2009

(30) Foreign Application Priority Data

Nov. 14, 2007   (JP)   ............................. 2007-295497
Oct. 24, 2008   (JP)   ............................. 2008-274351

(51) Int. Cl.
    *G02F 1/1335*    (2006.01)
(52) U.S. Cl. ............................. 349/113; 349/5; 349/137
(58) Field of Classification Search ............... 349/5–10, 349/113, 137
    See application file for complete search history.

(56) References Cited

U.S. PATENT DOCUMENTS 5,708,486 A * 1/1998 Miyawaki et al. ............. 349/44

2006/0033870 A1 * 2/2006 Iwasa et al. .................. 349/137

FOREIGN PATENT DOCUMENTS

| JP | 2002-221717 | 8/2002 |
| JP | 2004-004337 | 1/2004 |
| JP | 2005-326615 | 11/2005 |

OTHER PUBLICATIONS

U.S. Appl. No. 12/326,439, filed Dec. 2, 2008, Hiroshi Mizuno, et al., Pending.

* cited by examiner

*Primary Examiner*—Mark A Robinson
*Assistant Examiner*—Michael P Mooney
(74) *Attorney, Agent, or Firm*—Fitzpatrick, Cella, Harper & Scinto (57) ABSTRACT

A light leakage is suppressed, and the effect of interference is reduced. A substrate for a reflection type liquid crystal display apparatus disposed opposite to a transparent substrate by sandwiching the liquid crystal and including a semiconductor substrate constituting the reflection type liquid crystal display apparatus, including a plurality of reflection electrodes disposed above the semiconductor substrate so as to be opposed to the transparent substrate, and a metal layer disposed between the semiconductor substrate and the reflection electrodes in order to reflect upward the light entering through a gap of the plurality of reflection electrodes from the above, wherein the metal layer has a concave portion in a region corresponding to the gap.

14 Claims, 11 Drawing Sheets

INTERFERENCE

SUBSTRATE FOR A REFLECTION TYPE LIQUID CRYSTAL DISPLAY APPARATUS, REFLECTION TYPE LIQUID CRYSTAL DISPLAY APPARATUS USING THE SAME, AND LIQUID CRYSTAL PROJECTOR APPARATUS USING THE SAME

BACKGROUND OF THE INVENTION

1. Field of the Invention

The present invention relates to a reflection type liquid crystal display apparatus for displaying an image, a character, and the like using a liquid crystal, a substrate used for the reflection type liquid crystal display apparatus, a liquid crystal projector apparatus using the reflection type liquid crystal display apparatus, and a rear projection apparatus.

2. Description of the Related Art

In the reflection type liquid crystal display apparatus, a majority of lights incident from a transparent substrate side and transmitting a liquid crystal layer is reflected by a pixel electrode (reflection electrode) having a reflection characteristic. However, a part of the light transmitting the liquid crystal layer enters a gap between the reflection electrodes. The light entering a gap between the reflection electrodes propagates an interlayer film (usually a dielectric substance such as $SiO_2$ and the like) between wirings and reaches a ground silicon substrate at a probability, while reflecting between the electrodes and attenuating or transmitting the metal electrode which is the wiring and attenuating. The carrier generated by that light changes a storage voltage of the reflection electrode. This phenomenon is referred to as a light leakage.

In the case of positive and negative field inversion operations (with respect to a reference voltage, voltages negative and positive and equal in absolute value are written every one time by a double-speed operation, respectively), when the light leakage exceeds a reference, the change in the storage voltage by the light leakage is always in the same direction, and therefore, the positive and negative field voltages are prevented from substantially becoming the same absolute value. Hence, a flicker (a difference of brightness between the positive and negative fields) arises. Phenomenally, by measuring this flicker, the degree of the light leakage can be estimated.

With respect to the light leakage, by controlling a quantity of the light reaching the silicon substrate, the change in the storage voltage of the reflection electrode can be substantially suppressed. One of the methods for controlling the quantity of the light reaching the silicon substrate includes one for attenuating the light directly coming from the gap between the reflection electrodes by providing a light shielding layer directly under the reflection electrodes. Further, there is a method in which the interlayer film, through which the light between the light shielding layer and the reflection electrode propagates, is made thin to make a light propagating path thin, thereby suppressing the quantity of the light propagating through the interlayer film. Further, there is a method in which an anti reflection film is formed at the interlayer film side of the upper and lower electrodes of the interlayer film in which the light propagates, thereby attenuating the quantity of the light.

Japanese Patent Application Laid-Open No. 2002-221717 discloses that the distance between the reflection electrode and the light shielding layer is made small to suppress the light leakage.

Japanese Patent Application Laid-Open No. 2004-004337 discloses a double structure made of the light shielding layer and the anti reflection film, and a structure having no anti reflection film in the gap between the reflection electrodes.

Japanese Patent Application Laid-Open No. 2005-326615 discloses a structure in which the light shielding layer is of two layers, and the upper layer thereof is connected to the reflection electrode, and does not exist in the gap between the reflection electrodes, and the underlying oblique layer is not connected to the reflection electrode, and is made flat.

The present inventor has found that, when a distance between the reflection electrode and the light shielding layer is made small to suppress the light leakage, a problem arises that there is an interference between the light reflected by the light shielding layer and going out from the gap between the reflection electrodes and the light reflected by the reflection electrode.

An object of the present invention is to suppress the light leakage and to provide a substrate for a reflection type liquid crystal display apparatus that reduces the effect of interference, a reflection type liquid crystal display apparatus using the same, and a liquid crystal projector apparatus.

SUMMARY OF THE INVENTION

In order to achieve the object, the present invention provides a substrate, for use in a reflection type liquid crystal display apparatus, including a semiconductor substrate placed in opposition to a transparent substrate sandwiching a liquid crystal therebetween to form the reflection type liquid crystal display apparatus comprising: a plurality of reflection electrodes arranged on an upper side of the semiconductor substrate in opposition to the transparent substrate; and a metal layer placed between the semiconductor substrate and the reflection electrode, so as to reflect a light back incident through a gap between the reflection electrodes from the upper side of the semiconductor substrate toward the same upper side. The metal layer has a first reflection surface at a region corresponding to the gap, a second reflection surface being flat at a region except for the region corresponding to the gap, and the first reflection surface is placed closer to the semiconductor substrate rather than the second reflection surface.

Further, according to another aspect, the present invention provides a substrate, for use in a reflection type liquid crystal display apparatus, including a semiconductor substrate placed in opposition to a transparent substrate sandwiching a liquid crystal therebetween to form the reflection type liquid crystal display apparatus comprising: a plurality of reflection electrodes arranged on an upper side of the semiconductor substrate in opposition to the transparent substrate; and a metal layer placed between the semiconductor substrate and the reflection electrode, so as to reflect a light back incident through a gap between the reflection electrodes from the upper side of the semiconductor substrate toward the same upper side. The metal layer has a concave portion in a region corresponding to the gap between the reflection electrodes.

According to still another aspect, the present invention provides a reflection type liquid crystal display apparatus comprising: a substrate for use in the reflection type liquid crystal display apparatus; a transparent substrate disposed in opposition to the substrate for use in the reflection type liquid crystal display apparatus; and a liquid crystal disposed between the transparent substrate and the substrate for use in the reflection type liquid crystal display apparatus.

The reflection type liquid crystal display apparatus of the present invention has the substrate for a reflection type liquid crystal display apparatus of the present invention, the transparent substrate disposed opposite to the substrate for a reflection type liquid crystal display apparatus, and a liquid crystal disposed between the substrate for a reflection type liquid crystal display apparatus and the transparent substrate.

The liquid crystal projector apparatus of the present invention uses the reflection type liquid crystal display apparatus of the present invention.

According to the present invention, while suppressing the light leakage, the difference in the intensity of the interference by the light returning from the light shielding layer and the reflection light by the reflection electrode can be suppressed small, and therefore, even when an optical path difference contributing to the interference changes due to process variations, the variation of the reflection intensity can be suppressed.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Prior to the description of the embodiments of the present invention, the technical background leading to the present invention will be described.

Figure 10:
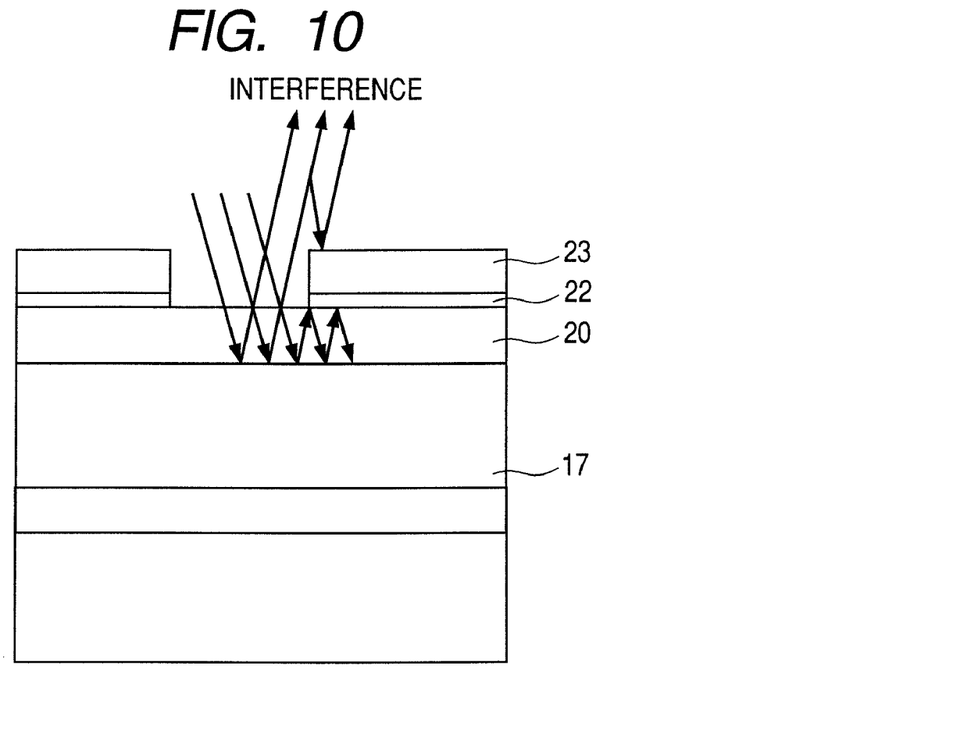
FIG. 10 is a view for describing an operation of the reflection type liquid crystal display apparatus relating to the present invention.

The present inventor, as illustrated in FIG. 10, has made a study of making a distance between a first layer 23 and a light shielding layer 17 of reflection electrodes (22 and 23) small to suppress a quantity of the propagated light through an interlayer film so as to suppress a light leakage. However, the present inventor, while at the stage of proceeding with the study, has found that interference arises between the light reflected at the light shielding layer 17 and going out from the gap between the reflection electrodes and the light reflected at the reflection electrodes, thereby affecting the display.

The intensity of the interference is simply a difference (d) in the position of the height with the reflection electrode surface and the reflection surface of the light shielding layer, and when $2d=m*\lambda/N$, the intensity of the interference strengthens each other, but if $2d=(m+\frac{1}{2})*\lambda/N$, the intensity of the interference weakens each other. Here, n represents a refractive index of the dielectric substance material, $\lambda$ a wavelength of the incident light, and m an integer not less than 0. Hence, when the thickness of the interlayer film between the light shielding layer and the reflection electrode and the thickness of the reflection electrode vary, the wavelengths strengthening and weakening each other of the above described formulas get out of alignment, and the wavelength dispersion of the refractive index varies. That is, the refractive index at each wavelength of RGB varies. When the distance between the light shielding layer and the reflection electrode is made small to suppress the light leakage, the intensity of the light that returns again to the gap between the reflection electrodes from the light shielding layer is increased, and the difference in the intensity of the interference becomes large.

The reason why the intensity of the light is attenuated is because of the following reasons.

1) A gap between the reflection electrodes is several hundreds nm, and this is at the same level as the wavelength of a visible light, and therefore, the light entering between the reflection electrodes is deflected, and the intensity of the light which enters between the reflection electrodes has an angle component from a vertical state. The distance (thickness of the interlayer film) between the light shielding layer and the gap between the reflection electrodes becomes large, so that the component proceeding approximately vertical to the light shielding layer is attenuated, and further, a probability that the reflected light returns again between the reflection electrodes is also reduced.

2) Since the surface of the light shielding layer is not an ideal smooth surface, the distance (which becomes the thickness of the interlayer film) between the light shielding layer and the gap between the reflection electrodes becomes large, so that the component scattered and not returning to between the reflection electrodes further increases.

3) Since the light propagates inside the dielectric substance, the intensity of the light is attenuated depending on the distance by which the interlayer film reciprocates in the thickness direction. When the interlayer film is a silicon oxide, there is almost no attenuation in the visible light, and therefore, it is unnecessary to take the attenuation so much into consideration.

Figure 11:
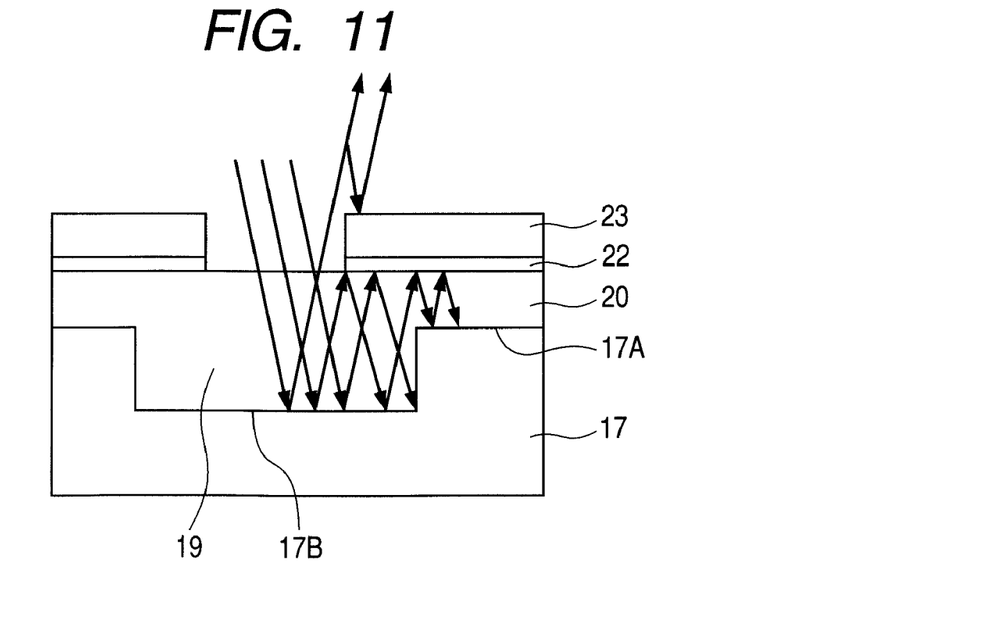
FIG. 11 is a view for describing the operation of the reflection type liquid crystal display apparatus of the present invention.

Hence, the present inventor, as illustrated in FIG. 11, has formed a concave portion 19 in the light shielding layer directly under the gap between the reflection electrodes to obtain a liquid crystal display apparatus suppressing the effect of the interference, while making the distance between the light shielding layer and the reflection electrode small to suppress the light leakage. In other words, the position of the upper surface 17B of the light shielding layer directly under the gap between the reflection electrodes is made closer to the semiconductor substrate than the approximately flat upper surface 17A (the upper surface nearest to the rear surface of the reflection electrode) of the light shielding layer directly under the reflection electrodes. That is, the light shielding layer in the present invention is disposed between the semiconductor substrate and the reflection electrode, and is a metal layer for reflecting upward the light entering through the gap of the plural reflection electrodes from above. Further, the light shielding layer in the present invention has a first reflection surface 17B in the region corresponding to the gap of the plural reflection electrodes. In addition, the light shielding layer in the present invention has a flat second reflection surface 17A excepting the region corresponding to the gap of the plural reflection electrodes. The light shielding layer in the present invention has the first reflection surface 17B shaped more approximate to the semiconductor substrate than the second reflection surface 17A. In the present application, the upper surface of the light shielding layer means an upper surface seen from the semiconductor substrate side of the two main surfaces of the light shielding layer. Further, "approximately flat" in the second reflection surface means a surface state having no unevenness provided by a predetermined process similarly to the concave portion 19.

In this manner, by forming the concave portion 19 under the gap between the reflection electrodes, the distance (which becomes the thickness of the interlayer film) between the light shielding layer and the gap between the reflection electrodes becomes large, and the intensity of the light reflecting the light shielding layer and returning again to the gap between the reflection electrodes is attenuated, thereby suppressing the interference with the light reflecting the reflection electrodes. In the present invention, particularly, the distance between the second reflection surface 17A and a first layer 23 of the reflection electrodes (22 and 23) is preferably shorter than the wavelength range of the light to be used. When the distance between the second reflection surface 17A and the first layer 23 of the reflection electrodes is shorter than the wavelength range of the light to be used, without a space length enough to the wavelength, the light cannot maintain a wave form and therefore cannot be propagated or transmitted.

Thereby, the effect of suppressing the quantity of the propagation light through the interlayer film becomes more prominent. Further, the distance between the first reflection surface 17B and the reflection surface of the reflection electrode is preferably longer than the wavelength range of the light. Thereby, the effect of suppressing the interference between the light reflected by the first reflection surface 17B and the light reflected by the reflection surface of the reflection electrode becomes more prominent.

The width of the concave portion is preferably equal to or larger than the gap between the reflection electrodes in order to attenuate the intensity of the light reflecting the light shielding layer and returning again to the gap between reflection electrodes. However, the width of the concave portion may be made smaller than the gap between the reflection electrodes within the range possible to recognize the suppression of the interference and cause no problem when using.

First Embodiment

Figure 1:
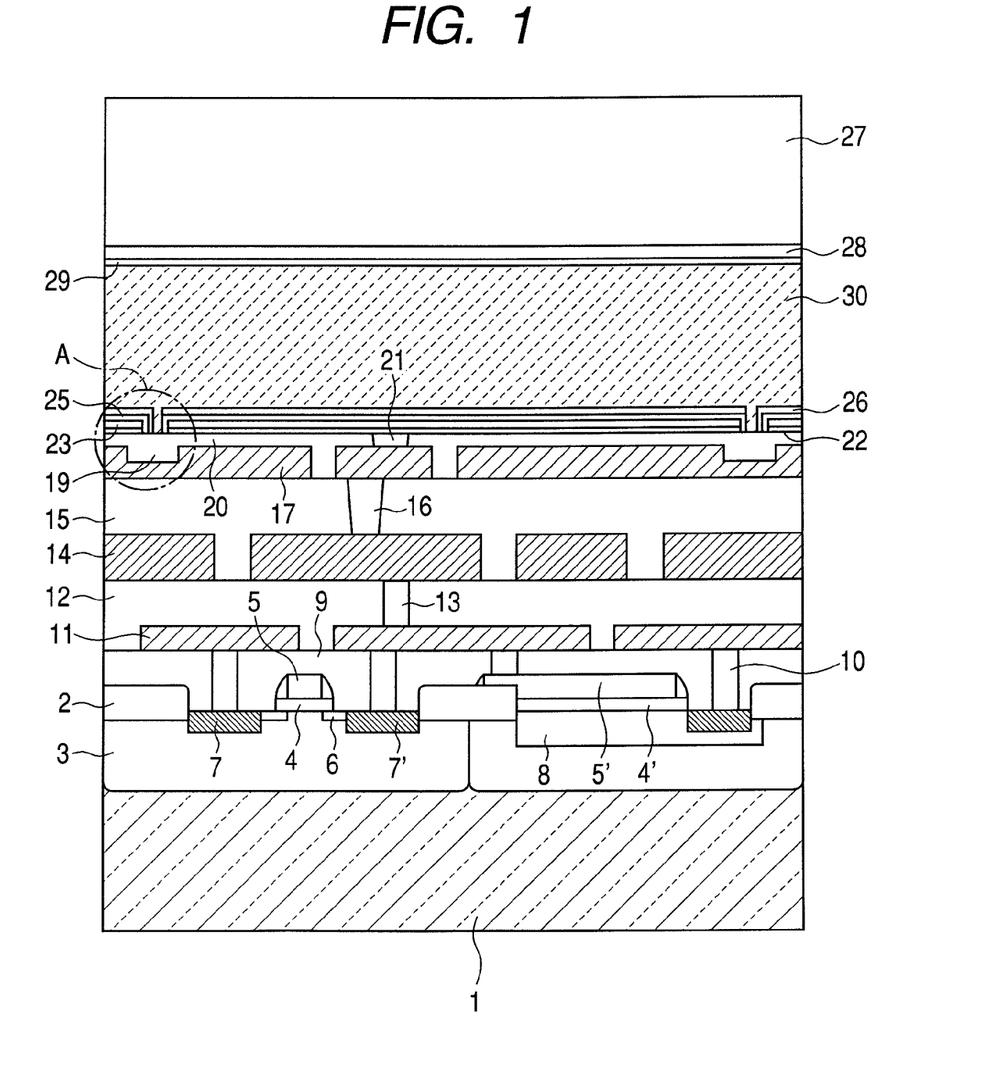
FIG. 1 is a sectional view of a reflection type liquid crystal display apparatus of a first embodiment of the present invention.
Figure 2:
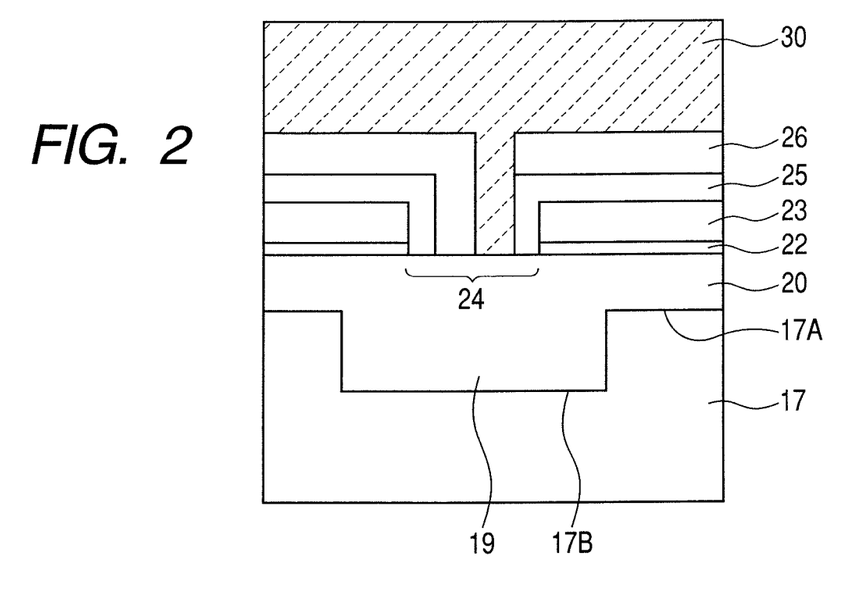
FIG. 2 is an enlarged view of a portion A of FIG. 1.
Figure 3:
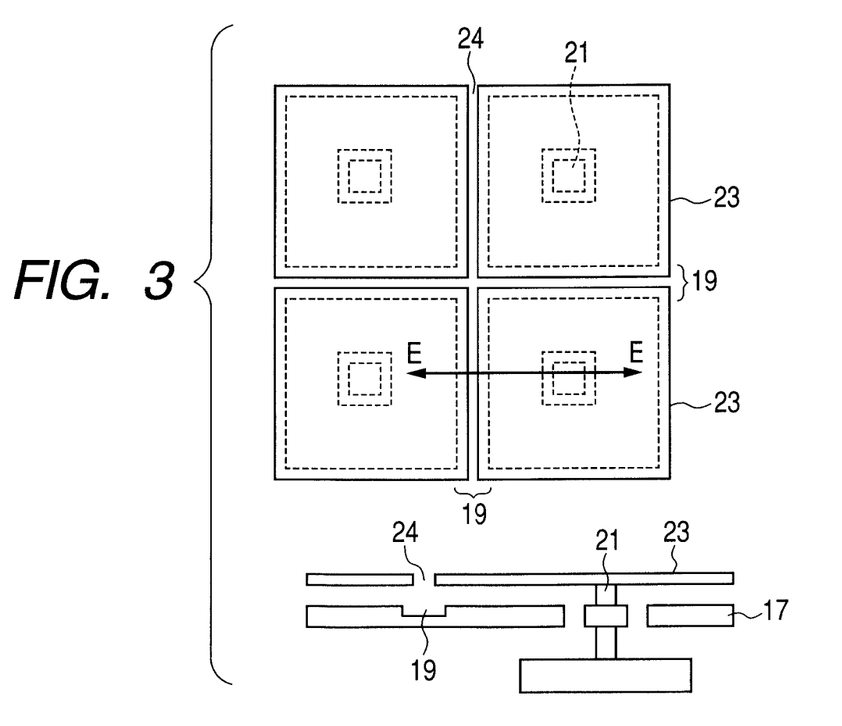
FIG. 3 is a top plan view of the reflection type liquid crystal display apparatus of the first embodiment of the present invention.

FIG. 1 is a sectional view of a reflection type liquid crystal display apparatus of a first embodiment of the present invention. FIG. 2 is an enlarged view of a portion A of FIG. 1. Further, FIG. 3 is a part of the top plan view of the reflection type liquid crystal display apparatus of the first embodiment of the present invention and a sectional view showing a section cut along the line E-E of the top plan view. The top plan view and the section view of FIG. 3 are figures showing the portions only necessary for the description.

Reference numeral 1 denotes an n-type silicon substrate (becomes a semiconductor substrate), numeral 2 a LOCOS (Local Oxidization of Silicon) oxide film which becomes a selective oxide film, numeral 3 a PWL (well of a p-type), numeral 4 a gate oxide film, and numeral 4' an oxide film of a retention capacitor. Further, reference numeral 5 denotes a gate electrode, for example, made of polycrystalline silicon, numeral 5' an upper side electrode, for example, made of polycrystalline silicon for forming the retention capacitor, numeral 6 an NLD (decreased level N region: N type Lightly Doped Region), numeral 7 a source region, and numeral 7' a drain region. Further, reference numeral 8 denotes an n-type doped layer of the electrode at the substrate side forming the retention capacitor, numeral 9 a PSG (Phosphorus Silicate Glass), numeral 10 a contact hole, numeral 11 a first metal wiring layer, numeral 12 the PSG, numeral 13 a first through-hole, and numeral 14 a second metal wiring layer. Further, reference numeral 15 denotes a PSG, numeral 16 a second through-hole, numeral 17 a third metal wiring layer serving as a light shielding layer (metal layer), for example, an Al (aluminum) based metal. Further, reference numeral 19 denotes a concave portion of the third metal wiring layer 17 directly under the gap between the reflection electrodes, numeral 20 a PSG, numeral 21 a third through-hole, numerals 22 and 23 fourth metal wiring layers serving as reflection electrodes, of which numeral 22 denotes an anti reflection film, for example, a TiN (titanium nitride) or Ti (titanium), and numeral 23 denotes an Al (aluminum) based metal. Further, reference numeral 24 denotes the gap between the reflection electrodes, numeral 25 a surface $SiO_2$ film, numerals 26 and 29 alignment films, numeral 27 a glass substrate, numeral 28 a transparent electrode which is made of a transparent conductive layer, for example, ITO or ZnO, and numeral 30 a liquid crystal layer. The substrate formed of constructional elements from the n-type silicon substrate 1 to the alignment film 26 becomes a substrate for the reflection type liquid crystal display apparatus. The metal layer 17 is disposed between the semiconductor substrate 1 and the reflection electrodes 22 and 23 in order to reflect upward the light entering through the gap of the plural reflection electrodes 22 and 23 from above.

The transistor of the gate electrode 5, the source region 7 and the drain region 7' becomes a transistor for the switch of a pixel. The drain region 7' is connected to the reflection electrodes (22 and 23) through the contact hole 10, the first metal wiring layer 11, the first through-hole 13, the second metal wiring layer 14, the second through-hole 16, the third metal wiring layer 17, and the third through-hole 21. Further, the drain region 7' is connected to the upper side electrode 5' of the polycrystalline silicon through the contact hole 10, the first metal wiring layer 11, and the contact hole 10 again. A capacitance is formed between the upper side electrode 5' and an n-type doped layer (electrode at the substrate side) 8 of the substrate 1. In the present embodiment, the substrate 1 uses a single crystal semiconductor substrate.

The first metal wiring layer 11, the second metal wiring layer 14, the third metal wiring layer 17, and the fourth metal wiring layers (22 and 23) serving as the reflection electrodes are formed so as to cover the transistor for the switch of each pixel. These metal wiring layers 11 to (22 and 23) shield a rectilinear light directly incident on the substrate 1, and play a role also of attenuating its intensity, while reflecting the light propagating through the interlayer film of each metal wiring layer.

The reflection electrodes (22 and 23) are square in the present embodiment, and cover the whole surfaces almost without gap in between by laying these squares side by side. By so doing, an open area ratio is made near 100%.

The substrate (substrate for the reflection type liquid crystal display apparatus) at the reflection electrode side in which this square-shaped reflection electrode is formed in a matrix pattern and the glass substrate 27 serving as the transparent substrate forming the transparent electrode 28 are oppositely disposed, and between thereof, the liquid crystal is sealed by being sandwiched by both substrates, thereby forming the liquid crystal layer 30. In the present embodiment, the liquid crystal having a negative dielectric anisotropy is used.

Each surface of these two substrates is formed with the alignment films 26 and 29 for orientating the liquid crystal in a predetermined direction. The direction of orientation generally used is 45 degrees for the side of the square-shaped reflection electrode.

As insulating members, the PSGs 9, 12, 15, and 20 which becomes the interlayer films are provided, and the surface of each insulating member is polished by chemical mechanical polishing (CMP).

In the reflection type liquid crystal display apparatus of the present embodiment as described above, as illustrated in FIG. 2, the light shielding layer directly under the reflection electrodes (22 and 23) is provided with the concave portion 19. In other words, the region corresponding to the gap between the plural reflection electrodes is provided with the first reflection surface. In addition, the light shielding layer in the present invention has a flat second reflecting surface excepting the region corresponding to the gap between the plural reflection electrodes. The light shielding layer in the present invention has the first reflection surface shaped more approximate to the semiconductor substrate than the second reflection surface. By the concave portion 19, the thicknesses of the light shielding layer inside the concave portion and the PSG 20 serving as the interlayer film between the reflection electrodes become thick, so that the difference in the intensity of the interference by the light returning from between the pixels and the reflection light by the reflection electrode can be suppressed small. On the other hand, the thickness of the interlayer film between the second reflection surface of the light shielding layer except for the concave portion 19 and the reflection electrode can be made thin so as to make the propagation path thin, thereby the quantity of the propagation light through the PSG 20 serving as the interlayer film can be suppressed.

A manufacturing process of the reflection type liquid crystal display apparatus will be described below.

First, an n-type silicon substrate 1 in which the doping concentration is $10^{15}$ cm$^{-3}$ or less is subjected to local thermal oxidation, and a LOCOS oxide film 2 is formed.

With the LOCOS oxide film 2 as a mask, boron is ion-implanted at a dose of approximately $10^{12}$ cm$^{-2}$, thereby forming a PWL 3 which is a p-type doped region of a doping concentration of approximately $10^{15}$ cm$^{-3}$. In a part of the region, an n-type doped layer (which becomes a lower side electrode) 8 of the retention capacitor of an n-type doping concentration of approximately $10^{15}$ cm$^{-3}$ is formed.

This substrate 1 is again subjected to thermal oxidation, and a gate oxide film 4 of 100 nm or less in oxide film thickness and an oxide film 4' of the retention capacitor are formed.

Next, a gate electrode 5 made of an n-type poly silicon doped with phosphor of approximately $10^{20}$ cm$^{-2}$, and an upper side electrode 5' forming the retention capacitor are formed. After that, the whole surface of the substrate 1 is ion-implanted with phosphor at a dose of approximately $10^{12}$ cm$^{-2}$, and a NLD 6 which is the n-type doped region of the doping concentration of approximately $10^{15}$ cm$^{-3}$ is formed. Subsequently, with the patterned photo resist as a mask, phosphor is ion-implanted at a dose of approximately $10^{15}$ cm$^{-2}$, and the source region 7 and the drain region 7' of approximately $10^{19}$ cm$^{-3}$ of the doping concentration are formed.

Next, the whole surface of the substrate 1 is formed with the PSG 9 which is the interlayer film. This PSG can be substituted with NSG (Nondope Silicate Glass)/BPSG (Boro-Phosph Silicate Glass) and TEOS (Tetraetoxy-silane).

The PSG 9 directly above the source region 7 and the drain region 7' is formed with a hole which becomes a contact hole 10. After that, by CVD (Chemical vapor deposition) method, W (tungsten) is buried into the contact hole, and an extra W exposed on the PSG is polished and removed by the CMP.

To improve ohmic contact characteristics with this W electrode and the source region 7 and the drain region 7', a barrier metal such as TiN/Ti is preferably formed between the W electrode and the source region 7 and the drain region 7'.

Next, the first metal wiring layer 11 is formed 500 nm and is patterned. As the first metal wiring layer 11, TiN may be laminated at least at either of the upper and the lower parts of the metal layer such as Al.

On the whole surface, the PSG 12 is deposited approximately 1000 nm. The PSG at the position that connects the first metal wiring layer 11 and the second metal wiring layer 14 is formed with a hole serving as a through-hole 13. After that, by the CVD method, the W is buried into the through-hole, and the extra W exposed on the PSG is polished and removed by the CMP.

Next, the second metal wiring layer 14 is formed 800 nm, and is patterned. As the second metal wiring layer 14, TiN may be laminated at least at either of the upper and the lower parts of the metal layer such as Al.

On the whole surface, the PSG 15 is deposited approximately 1000 nm. The PSG at the position that connects the second metal wiring layer 14 and the third metal wiring layer 17 is formed with a hole serving as the through-hole 16. After that, by the CVD method, the W is buried into the through-hole, and further, the excessive W exposed on the PSG is polished and removed by the CMP.

Next, as the third metal wiring layer 17 serving as the light shielding layer, the metal layer 17 such as Al is formed 800 nm, and a region (region corresponding to the gap 24) directly under the gap 24 between the reflection electrodes is resist-patterned for the step formation and etched, and is made approximately 200 nm in thickness. The metal layer 17 other than that region is not subjected to any particular process such as an etching for the step formation. Thereby, in the metal layer 17, between the surface (the first reflection surface in the region corresponding to the gap 24) of the region directly under the gap 24 and the surface (second reflection surface) other than that region, a step 19 of approximately 600 nm is formed. After removing the resist, the metal layer 17 is patterned, thereby to form the light shielding layer.

On the whole surface, the PSG 20 is deposited, which is made thin to the thickness of approximately 100 nm in the region of the step upper surface of the metal layer 17 by the CMP.

Next, the PSG at the position that connects the third metal wiring layer 17 and the fourth metal wiring layers (22 and 23) serving as the reflection electrodes is formed with a hole serving as the through-hole 21. After that, by the CVD method, the W is buried into the through-hole, and the excess W exposed on the PSG is polished and removed by the CMP.

Next, as the fourth metal wiring layers (22 and 23), an anti reflection film TiN layer 22 is formed 50 nm, and thereupon, the metal layer 23 such as Al is formed 100 nm, and is patterned to a pixel shape. The fourth metal wiring layer functions as the reflection electrode in the pixel region.

Next, after forming the PSG layer on the reflection electrode, SiO$_2$ is also buried into the gap 24 between the reflection electrodes by the polishing, and a SiO$_2$ layer 25 flat in the surface is formed 50 nm. This process is not restrictive, but may use either of the following processes (1) or (2). The process (1): After forming the PSG layer on the reflection electrode, $SiO_2$ is removed until the metal layer is exposed by the CMP. The gap 24 between the reflection electrodes is buried by $SiO_2$. After that, $SiO_2$ is formed 10 nm on the whole surface of the layer 25. The process (2): the PSG layer is deposited and formed only 10 nm on the reflection electrode (not illustrated).

In the above described processes, the metal layer can use a metal film such as Al, Ti, Ta (tantalum), and W or an alloy containing these metals.

Figure 9:
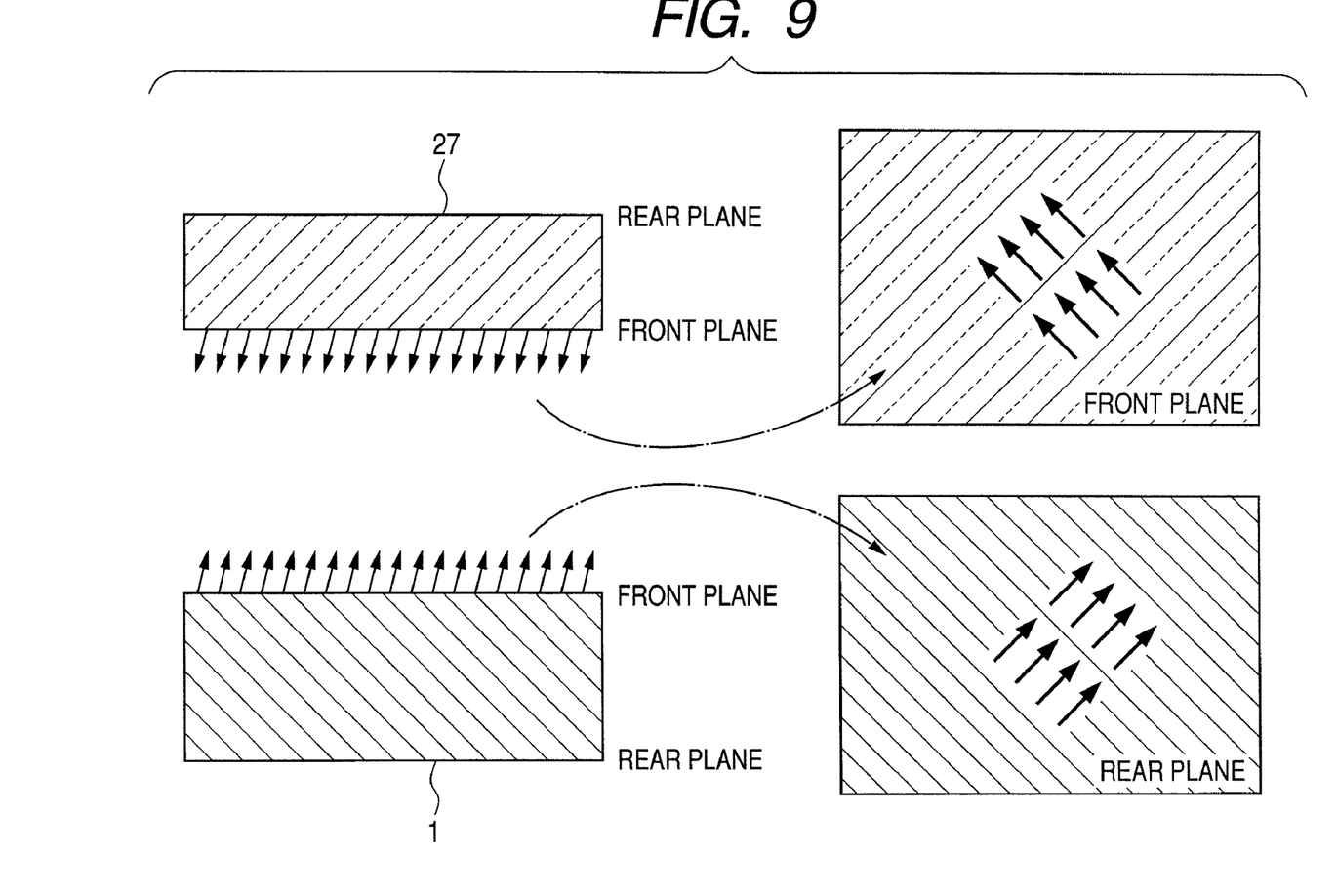
FIG. 9 is a sectional view and a top plan view showing an aspect of an oblique vapor deposition.

Next, the surface side of $SiO_2$ of the substrate 1 and an ITO 28 side of the glass substrate 27 fitted with the ITO 28 are deposited 50 nm with $SiO_2$ as alignment films 26 and 29 by a deposition apparatus, respectively. The deposited $SiO_2$ has a microstructure (needle-like or fine porous-like) having directivity, and the direction of its major axis is inclined to the plane of the substrate 1 and the glass substrate 27. Further, the direction vertical to the substrate surface and the direction of an evaporation source from the substrate are inclined at 50 to 90 degrees, and the inclining direction is 45 degrees to the side of the square-shaped reflection electrode at the silicon substrate side. At the ITO/glass side, when bonded to each other, an oblique direction of an oblique vapor deposition $SiO_2$ film forms $SiO_2$ so as to become similar to FIG. 9. In FIG. 9, the $SiO_2$ layer 25 is omitted from the ITO 28 on the glass substrate 27 and the PWL 3 of the silicon substrate 1 for ease of description. On the n-type silicon substrate 1, constructional elements up to the alignment film 26 are formed, thereby constituting a substrate for the reflection type liquid crystal display apparatus.

The surface of the silicon substrate side (substrate for the reflection type liquid crystal display apparatus) is coated with a sealing agent (by a dispenser method), and the glass is bonded in the predetermined direction, and the sealing agent is vulcanized by UV and heat. The liquid crystal is injected, and the injection port is sealed, thereby completing a liquid crystal cell.

Subsequently, though not illustrated, each pad and a flexible substrate are connected by wire bond, ACF, and the like, thereby completing the liquid crystal apparatus.

When the quantity of the light leakage (can quantify by a level of the flicker) is measured, it is under the measurable limit. Further, the intensity difference of the interference with the light returning from between the reflection electrodes becomes small when compared with the case where the step is not provided. Each of the above described film thicknesses is described as one example, and even if its thickness is not complied, there is no possibility that the effect is made to nil.

Second Embodiment

Figure 4:
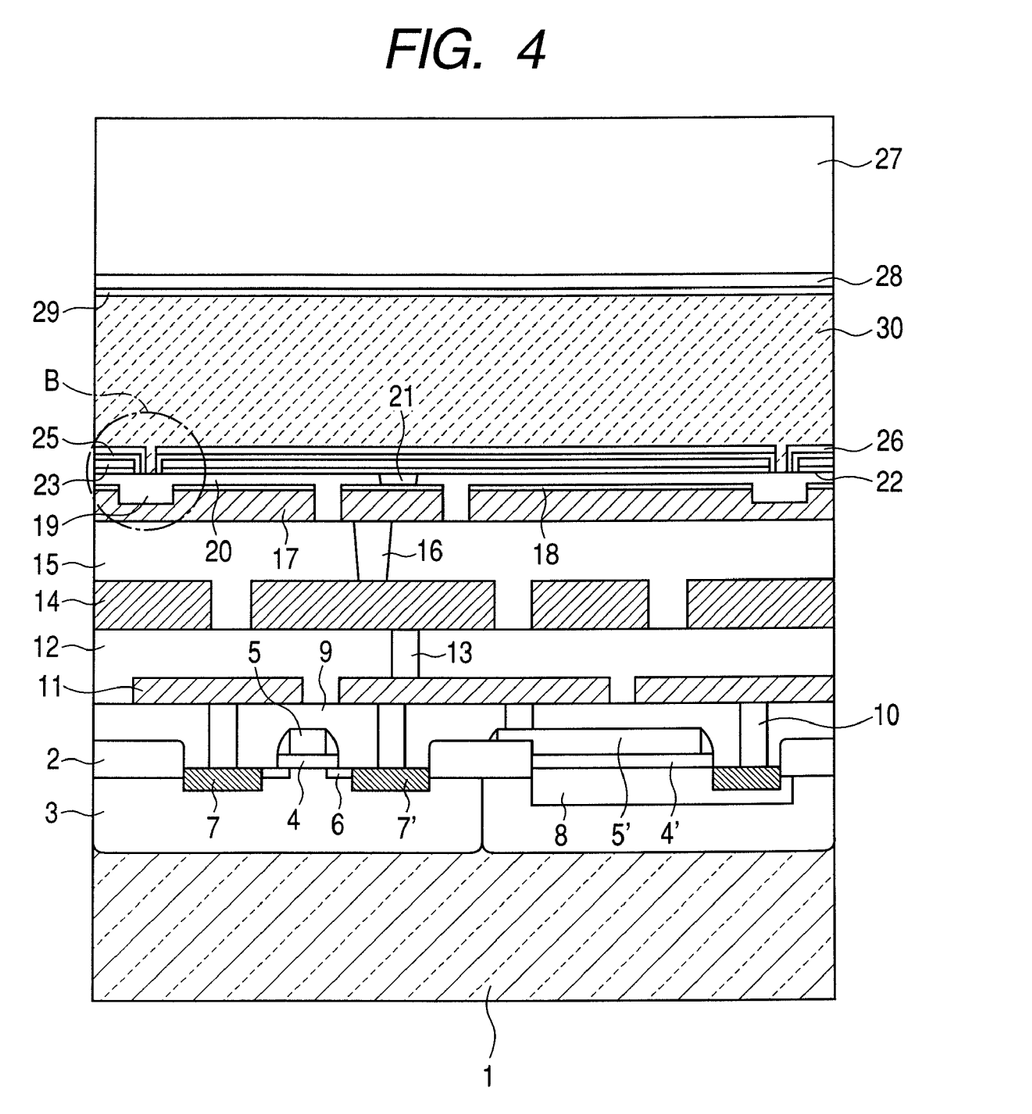
FIG. 4 is a sectional view of a reflection type liquid crystal display apparatus of a second embodiment of the present invention.
Figure 5:
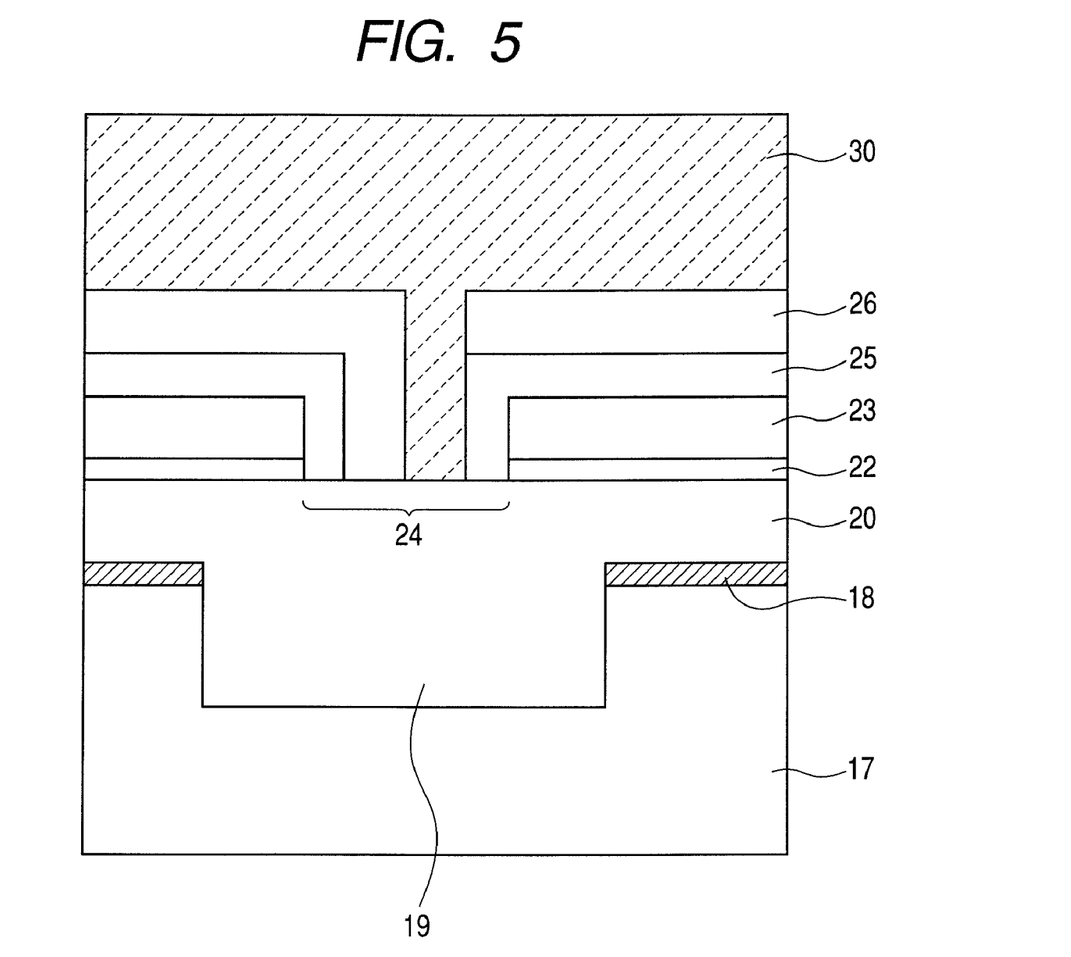
FIG. 5 is an enlarged view of a portion B of FIG. 4.

FIG. 4 is a sectional view of a reflection type liquid crystal display apparatus of a second embodiment of the present invention. FIG. 5 is an enlarged view of a portion B of FIG. 4. The same constructional elements as the members shown in FIGS. 1 and 2 will be assigned the same reference numerals, and the description of the configuration and the manufacturing method thereof will be omitted.

In the present embodiment, as a third metal wiring layer which becomes a light shielding layer, a layer laminated with an anti reflection film such as TiN on a metal layer is used. However, the configuration is such that no anti reflection film of TiN exists directly under a gap between reflection electrodes. Here, the configuration is such that the anti reflection film of TiN does not exist inside a concave portion 19. In other words, the anti reflection film is disposed only on a second reflection surface of the metal layer which becomes a light shielding layer, and moreover, no anti reflection film is disposed on the first reflection surface of the metal layer. In the present embodiment, TiN becomes the anti reflection film, but the anti reflection film of the present application is not restricted to Tin, and may be higher in light absorption characteristics and lower in reflection characteristics than the metal layer.

The points in which the manufacturing method of the present embodiment is different from the first embodiment will be described below.

As the third metal wiring layer, a metal layer 17 such as Al is formed 800 nm, and thereon, a TiN layer 18 serving as an anti reflection film is formed 50 nm. The region directly under the gap 24 between the reflection electrodes are resist-patterned, and a TiN layer 18 and a metal layer 17 are etched, and the metal layer 17 is made to the thickness of approximately 200 nm In the metal layer, between the surface (a first reflection surface in the region corresponding to the gap 24) of the region directly under the gap 24 and the surface (a second reflection surface) other than that region, a step is formed approximately 600 nm. In other words, in the region directly under the gap 24 is formed a concave portion 19. After removing the resist, TiN/Al layers are bonded to each other and are patterned, thereby forming wiring.

Under the reflection electrode, between the Al layer 17 serving a first layer of the third metal wiring layer and a fourth metal wiring layer (reflection electrode), a TiN layer 18 serving as the anti reflection film is formed, so that the intensity of the light penetrating through that layer can be attenuated, thereby increasing the effect of suppressing the light leakage.

Third Embodiment

Figure 6:
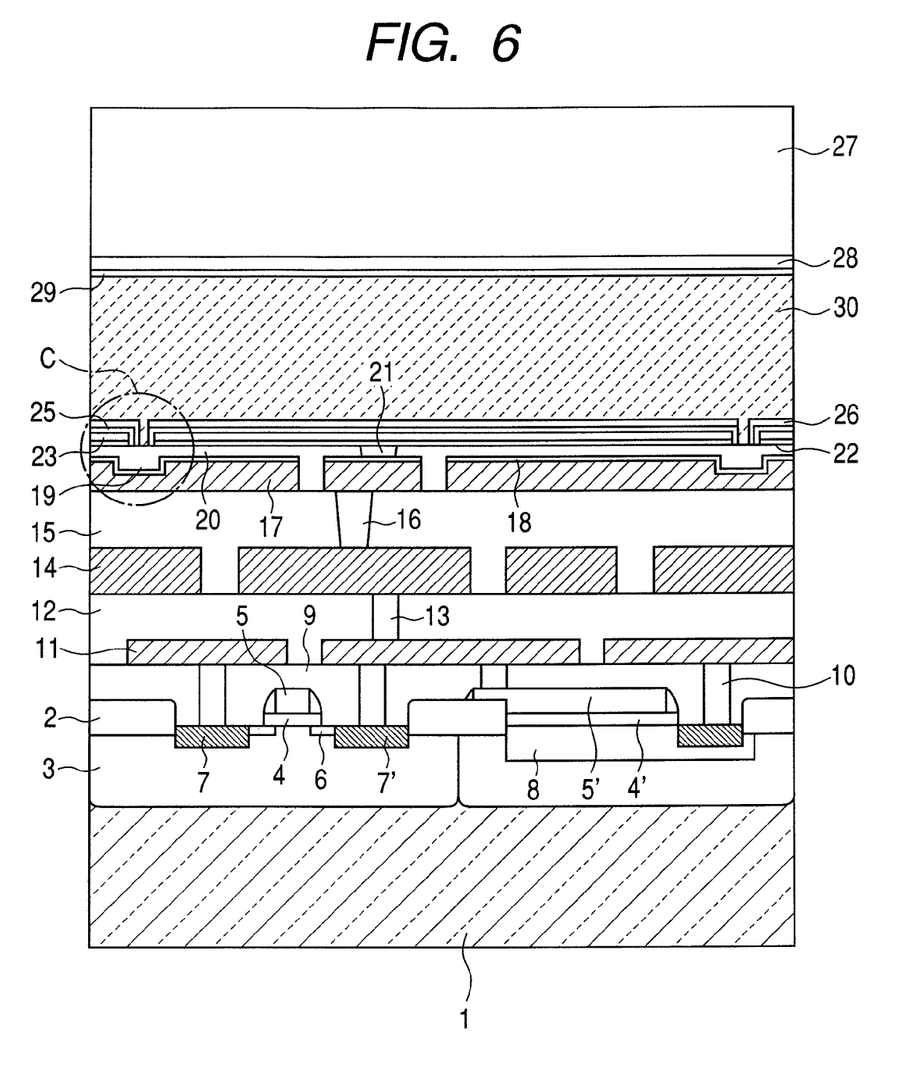
FIG. 6 is a sectional view of a reflection type liquid crystal display apparatus of a third embodiment of the present invention.
Figure 7:
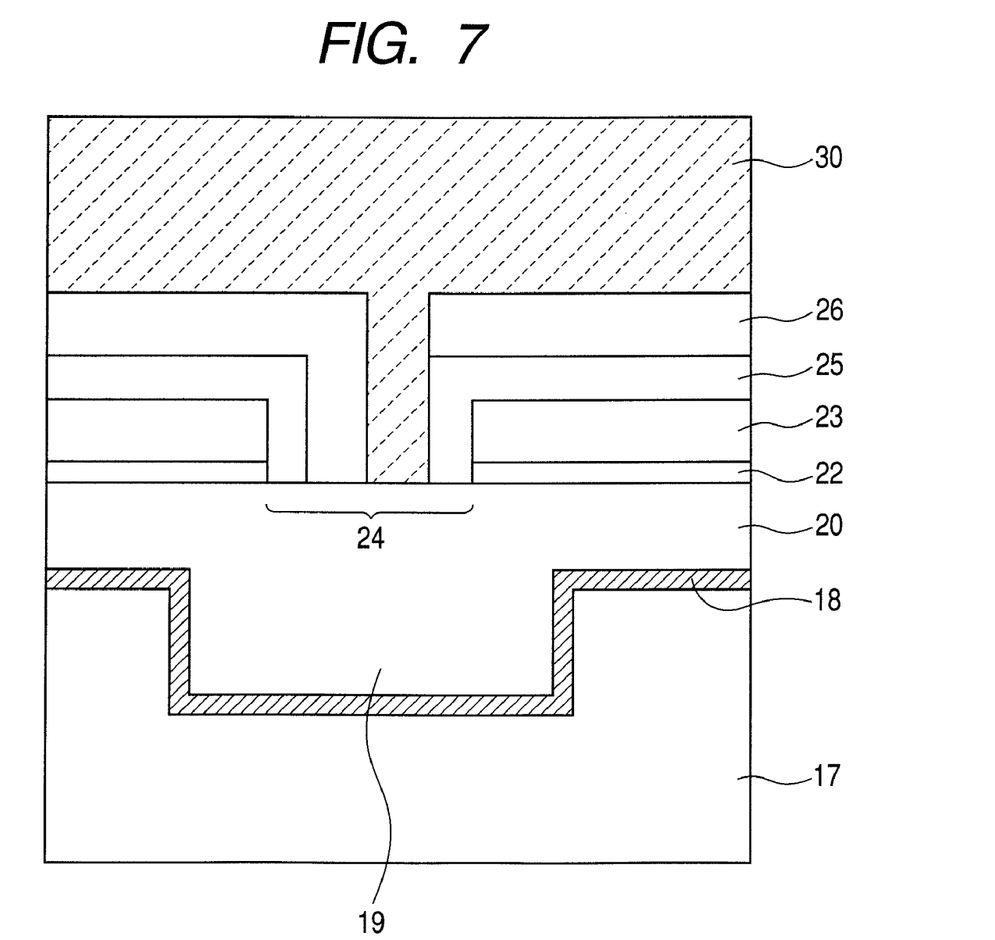
FIG. 7 is an enlarged view of a portion C of FIG. 6.

FIG. 6 is a sectional view of a reflection type liquid crystal display apparatus of a third embodiment of the present invention. FIG. 7 is an enlarge view of a portion C of FIG. 6. The same constructional elements as the members shown in FIGS. 1 and 5 will be assigned the same reference numerals, and the description of the configuration and the manufacturing method thereof will be omitted.

In the present embodiment, as a third metal wring layer, a layer laminated with a TiN layer 18 serving as an anti reflection film on a metal layer such as Al is used, and the configuration is such that the TiN layer 18 exists even between reflection electrodes. That is, the TiN layer 18 is provided even inside a concave portion 19. In other words, an anti reflection film is disposed on a second reflection surface of the metal layer serving as a light shielding layer, and moreover, the anti reflection film is disposed also on a first reflection surface of the metal layer.

The points in which the manufacturing method of the present embodiment is different from the first and second embodiments will be described below.

As the third metal wiring layer, a metal layer 17 such as Al is formed 800 nm, and the position (region corresponding to a gap 24) directly under the gap 24 between reflection electrodes is resist-patterned for the step formation, and is etched, and is made to the thickness of approximately 200 nm. Thereby, in the metal layer 17, between the surface (a first reflection surface in the region corresponding to the gap 24) of the region directly under the gap 24 and the surface (second reflection surface) other than that region, a step (concave portion) 19 of approximately 600 nm is formed. After removing the resist, the TiN layer 18 serving as the anti reflection film is formed 50 nm on the whole surface of the metal layer 17 including the step, and the TiN/Al layers are bonded to each other and are patterned.

On the upper surface of the third metal wiring located directly under the gap between fourth metal wiring layers (reflection electrodes) is also formed the TiN layer 18 serving as the anti reflection film, so that the light penetrating though the reflection electrodes is reflected and penetrates through the reflection electrodes again, thereby enabling the level of the effect on the interference to be further reduced.

Fourth Embodiment

The present embodiment relates to another manufacturing method of the same structure as the first embodiment shown in FIG. 1.

After forming a third metal wiring, an interlayer PSG 20 is formed as follows.

On the whole surface is deposited the PSG 20, and with the step upper surface (second reflection surface) of a metal layer 17 such as Al as a polishing stopper, $SiO_2$ is polished by CMP. The PSG is in a state of being buried only in the concave portion of the step and the gap of the wiring pattern. After that, the PSG is formed approximately 50 nm.

The subsequent manufacturing method is the same as in the first embodiment.

Between a light shielding layer and reflection electrodes, an uniform (uniformity is good because of the thickness not controlled by CMP) $SiO_2$ of 50 nm is formed. Hence, for the light penetrating from the gap between the reflection electrodes it becomes further difficult to infiltrate under the reflection electrodes, and therefore, tolerance to the light leakage becomes strong. Further, at the same time as the suppression of the light leakage, a short-circuit between a third metal wiring layer 17 and the fourth metal wring layer by process variations (CMP variations) can be avoided.

The PSG formed after polishing $SiO_2$ can be made thin to the extent of not causing short-circuit between the reflection electrode and the third metal wiring layer 17 (here up to approximately 50 nm). The thinner the thickness of the PSG as the interlayer film is, the stronger the light leakage tolerance becomes. The manufacturing method of the present embodiment can be used also for the manufacturing of the reflection type liquid crystal display apparatus of the second and third embodiments.

Fifth Embodiment

Figure 8:
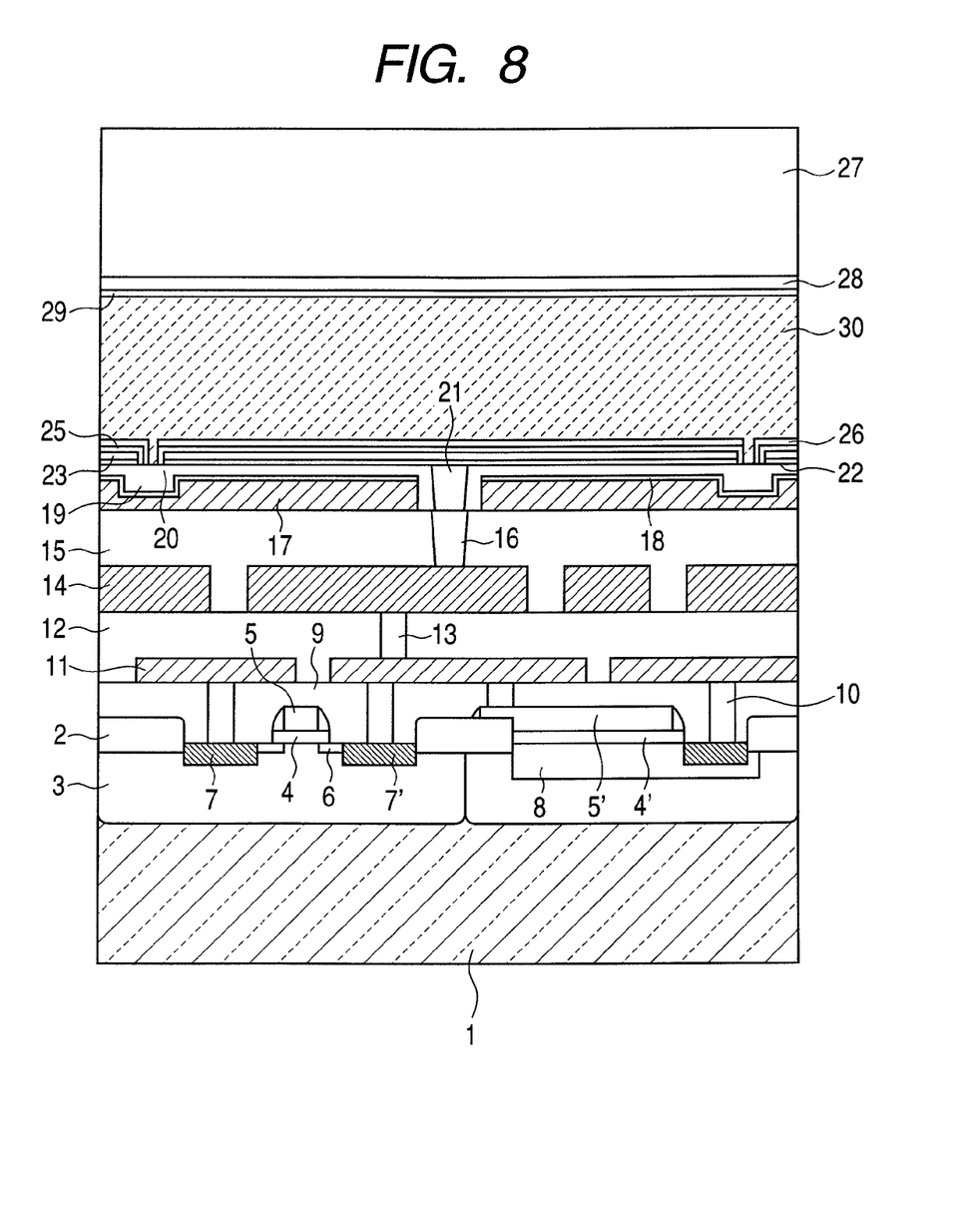
FIG. 8 is a sectional view of a reflection type liquid crystal display apparatus of a fourth embodiment of the present invention.

FIG. 8 is a sectional view of a reflection type liquid crystal display apparatus of a fifth embodiment of the present invention. The same constructional elements as the members shown in FIGS. 1 to 5 are assigned the same reference numerals, and the description of the configuration and the manufacturing method thereof will be omitted.

The present embodiment is different from the second embodiment in that a through-hole connecting a reflection electrode and a second metal wiring layer is in a stacked shape.

In FIG. 4, third metal wirings between a through-hole 16 and a through-hole 21 are paths to write signal voltages on reflection electrodes to become the reflection electrodes, and therefore, third metal wirings are desirably independent from each other in each pixel. That is, the third metal wirings are preferably in a state of at least being not connected to the light shielding layer 17 disposed between the reflection electrodes. As a general technique of the semiconductor multilayer wiring process, there is a technique in which the through-hole 16 and the through-hole 21 are directly stacked without a metal wiring layer between the through-hole 16 and the through-hole 21. As illustrated in FIG. 8, the through-hole 16 and the through-hole 21 are disposed in the same in-plane position.

As the effect of the present embodiment, since the connection with the through-hole 16 and the reflection electrodes is performed only by the through-hole 21, the area of the gap between the third metal wirings becomes small, and the quantity of the light entering the first substrate through that gap can be controlled. Further, the direct stacking position between the through-hole 16 and the through-hole 21 is preferably disposed at the center of the reflection electrode. This is because the shortest distance by which the light entering from the gap between the reflection electrodes and propagating by transmitting the gap between a fourth metal wiring layer (reflection electrode) and the third metal wiring layer reaches the gap between the third metal wiring layers can be made long, and moreover, the light leakage can be suppressed.

Sixth Embodiment

Figure 12:
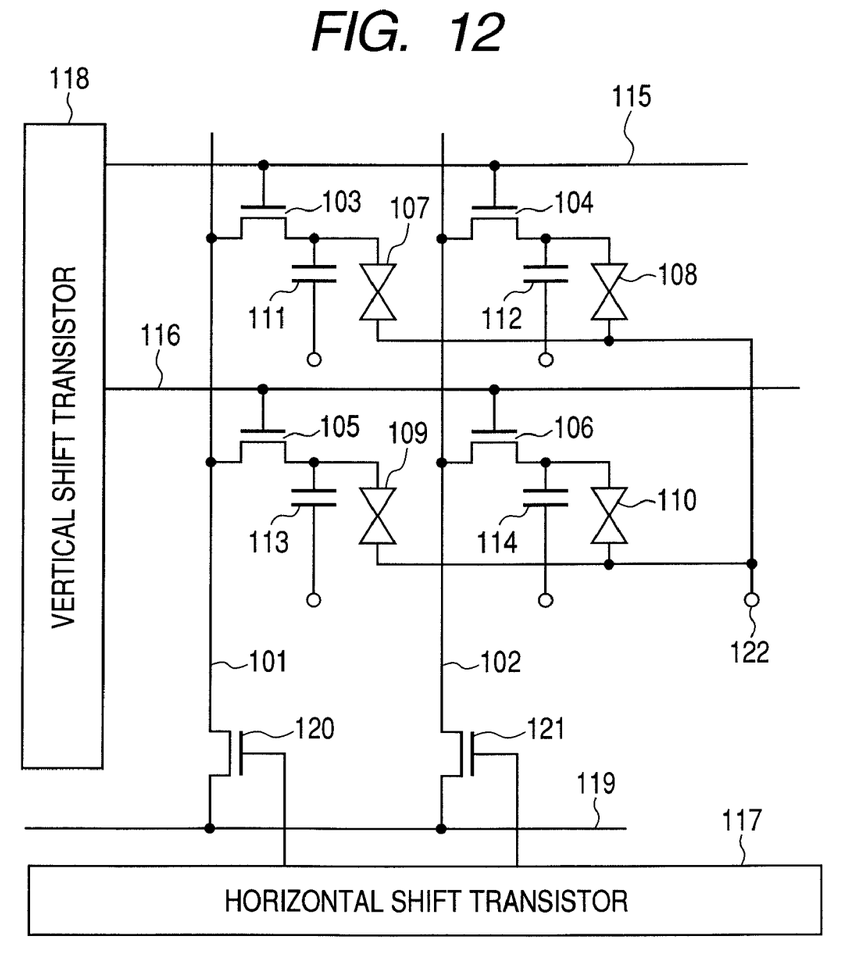
FIG. 12 is an equivalent circuit schematic diagram of the liquid crystal display apparatus according to the present invention.

FIG. 12 is one example of an equivalent circuit of a refection type liquid crystal display apparatus of the present embodiment used for a liquid crystal projector apparatus. Here, for ease of description, a pixel of 2×2 is shown.

In FIG. 12, reference numerals 101 and 102 denote signal lines, numerals 103 to 106 switching transistors of pixel portion, numerals 107 to 110 liquid crystals, numerals 111 to 114 retention capacitors of the pixel portion, numerals 115 and 116 driving lines (scanning lines), numeral 117 a horizontal shift register for scanning the signal lines 101 and 102. Further, reference numeral 118 denotes a vertical shift register for scanning the driving lines 115 and 116, numeral 119 a video line, numerals 120 and 121 sampling switches from the video line to the signal lines 101 and 102, and numeral 122 represents a counter electrode on a glass substrate serving as a second substrate. The glass substrate becomes a transparent substrate, and the counter electrode becomes a transparent electrode. The horizontal shift register 117, the vertical shift register 118, the switching transistors 103 to 106, the retention capacitors 111 to 114, and the sampling switches 120 and 121 are formed on the semiconductor substrate such as the silicon substrate serving as the first substrate.

The operation of the reflection type liquid crystal display apparatus of the present embodiment will be briefly described. In FIG. 12, though the pixel is represented and described by 2×2, this is just for easy of description, and X pixels×Y pixels (X and Y are the natural number of 2 or more, for example, in the case of SXGA+, 1400 pixels×1050 pixels) exist in a matrix pattern.

First, in FIG. 12, by the vertical shift register 118, into the driving line 115 are input signals so as to put the switching transistors 103 and 104 of the pixel portion into an ON state. At this ON-state time, by the horizontal register 117, the sampling switches 120 and 121 are sequentially turned ON, and from the video line 119, signals are transmitted to the signal lines 101 and 102. Specifically, the sampling switch 120 is opened, and the signal of the video line 119 is written in the signal line 101. Then, through the switching transistor 103 of the pixel portion, an electric charge is accumulated in the retention capacitor 111, and a voltage is applied to a liquid crystal 107 with the counter electrode 122. Next, after the sampling switch 120 is closed, the sampling switch 121 is opened, and the signal of the video line 119 is written in the signal line 102. Then, through the switching transistor 104 of the pixel portion, the electric charge is accumulated in the retention capacitor 112, and a voltage is applied to a liquid crystal 108 with the counter electrode 122. By this sequence, in the pixel connected to the sequence driving line 115 is sequentially written the signal (the electric charge is sequentially accumulated in the retention capacitor, and the signal is written) After the signal is written in all the pixels connected to the driving line 115, the driving line 115 is turned OFF, and this time, into a driving line 116 is input the signal so as to put the switching transistors 105 and 106 into an ON state. After that, by the same operation as the pixel connected to the driving line 115, in the pixel connected to the driving line 116 is written the signal. After the writing on all the pixels of the panel is finished, this operation is repeated again.

By using FIG. 13, the liquid crystal projector apparatus using any one of the reflection type liquid crystal display apparatuses of the first to the fifth embodiments will be described.

Figure 13:
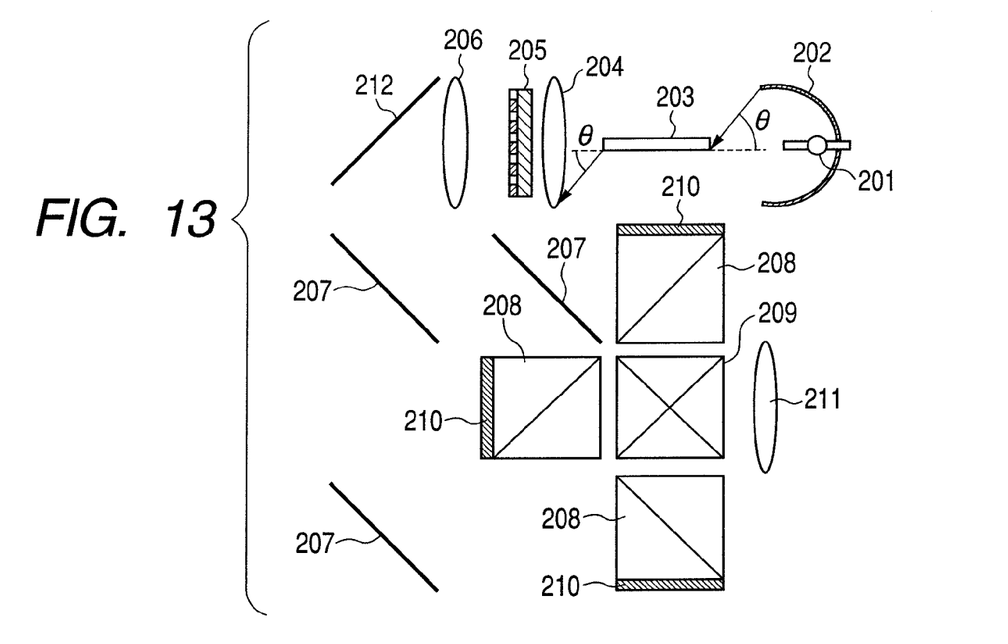
FIG. 13 is a descriptive view of a liquid crystal projector apparatus using the liquid crystal display apparatus according to the present invention.

FIG. 13 is one example of the liquid crystal projector apparatus. Reference numeral 201 denotes a lamp, numeral 202 a reflector, numeral 203 a rod integrator, numeral 204 a collimator lens, numeral 205 a polarization conversion system, numeral 206 a relay lens, and numeral 207 dichroic mirror. Further, reference numeral 208 denotes a polarization beam splitter, numeral 209 a cross prism, numeral 210 a liquid crystal panel, numeral 211 a projector lens, and numeral 212 a fully reflecting mirror. The liquid crystal panel 210 uses any one of the reflection type liquid crystal display apparatuses of the first to the fifth embodiments.

A light flux going out from the lamp 201 is reflected at the reflector 202, and is converged into an inlet of the integrator 203. This reflector 202 is an elliptic reflector, and its focal point exists at a light emitting portion and the inlet of the integrator. The light flux incident on the integrator 203 repeats reflection 0 to several times inside the integrator, and forms a secondary light source image at an outlet of the integrator. Although the secondary light source forming method includes a method using a fry eye, a description thereof will be omitted here. The light flux from the second light source is made into an approximately parallel light through the collimator lens 204, and is incident on the polarization beam splitter 205 of the polarization conversion system. A P-wave is reflected at the polarization beam splitter 205, and becomes a S-wave through a λ/2 plate, and all the waves become the S-waves, and are incident on the relay lens 206. The light flux is converged into the panel by the relay lens 206. During the conversion into the panel, a color separation system is formed by a color separation dichroic mirror 207, a polarization plate (not shown), the polarization beam splitter 208, the cross prism 209, and the like, and the S-wave is incident on three liquid crystal panels 210, respectively. In the liquid crystal panel 210, the liquid crystal shutter controls the voltage for each pixel by matching images. By the operation of the liquid crystal, the S-wave is modulated to an elliptically polarized light (or linearly polarized light), and by the polarization beam splitter 208, the p-wave component is made to be transmitted, and after making a color composition by the cross prism 209, a projection is made from the projector lens 211. This is a commonly practiced embodiment.

The liquid crystal projector apparatus of the present embodiment is installed in a casing, and can constitute the liquid crystal projector apparatus of a front projection system that projects the image light on a wall, an exclusive screen, and the like. Here, a description has been made on the liquid crystal projector apparatus of a three-panel system that uses three reflection type liquid crystal display apparatuses (liquid crystal panels). However, the reflection type liquid crystal display apparatuses of the first to the seventh embodiments can have color filters of Red (R), Green (G), and Blue (B) formed for each liquid crystal cell. By using any one of the reflection type liquid crystal display apparatuses of the first to the fifth embodiments thus constituted, the liquid crystal projector apparatus of a single panel (one panel) system can be constituted. Consequently, the reflection type liquid crystal display apparatuses of the first to the fifth embodiments can be used for the liquid crystal projector apparatus using one panel or more.

Figure 14:
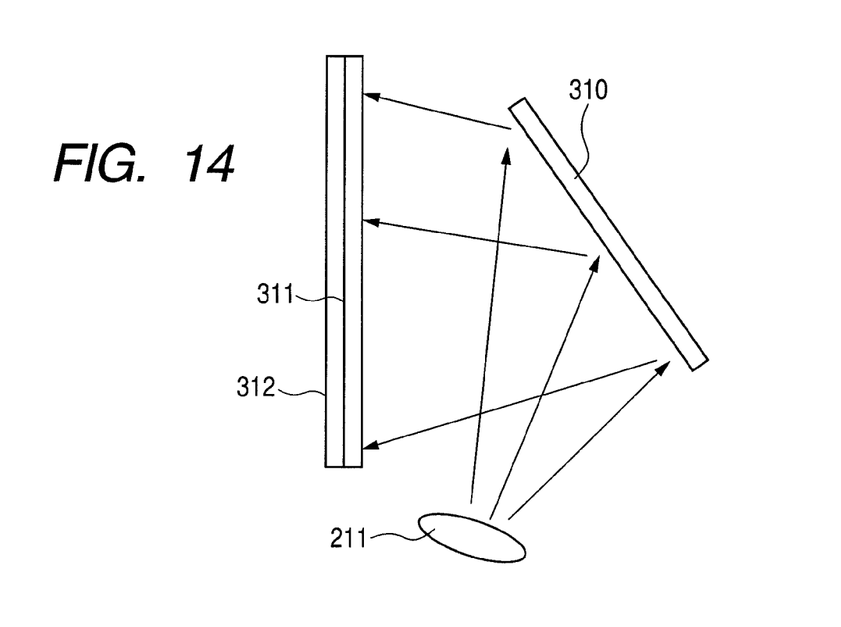
FIG. 14 is a descriptive view of a rear projection apparatus using the liquid crystal display apparatus according to the present invention.

Further, the liquid crystal projector apparatus of the present embodiment can be used for a projection apparatus such as a projection television receiver and the like. A rear projection system is a system in which the image light is projected to the rear surface of the screen to see the transmitted light of the screen. FIG. 14 is a descriptive view of the projection apparatus. The liquid crystal projector apparatus of the present embodiment is disposed in the casing together with a reflection mirror 310, a Fresnel lens 311 serving as a screen, and a lenticular lens 312, so that the rear projection apparatus such as the rear projection television receiver and the like can be constituted. In FIG. 14, for ease of description, the projector lens 211 only of the liquid crystal projector apparatus is illustrated.

As illustrated in FIG. 14, the light from the projector lens 211 of the liquid crystal projector apparatus is reflected by the reflection mirror 310, and is projected to the rear surface of the screen, and is made into a parallel light by the Fresnel lens 311, and through the lenticular lens 312, the light is dispersed at a high angle. The light projection to the rear surface of the screen from the projector lens 211 may be made directly without an intermediary of the reflection mirror.

The reflection type liquid crystal display apparatus of the present invention can be used for a front projector, a rear projector, and a television receiver using these projectors.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-295497, filed Nov. 14, 2007, and Japanese Patent Application No. 2008-274351, filed Oct. 24, 2008, which are hereby incorporated by reference herein in their entirety.

What is claimed is:

1. A substrate, for use in a reflection type liquid crystal display apparatus, including a semiconductor substrate placed in opposition to a transparent substrate sandwiching a liquid crystal therebetween to form the reflection type liquid crystal display apparatus comprising:

a plurality of reflection electrodes arranged on an upper side of the semiconductor substrate in opposition to the transparent substrate; and a metal layer placed between the semiconductor substrate and the reflection electrodes, so as to reflect a light back incident through a gap between the reflection electrodes from the upper side of the semiconductor substrate toward the same upper side, wherein the metal layer has a first reflection surface at a region corresponding to the gap and a second reflection surface being flat at a region except for the region corresponding to the gap, and the first reflection surface is placed closer the semiconductor substrate than the second reflection surface, and wherein a distance between the second reflection surface and the reflection electrode is shorter than a wavelength range of the incident light, and a distance between the first reflection surface and a reflection surface of the reflection electrode is longer than a wavelength range of the incident light.

2. The substrate according to claim 1, further comprising a reflection prevention film arranged at least on the second reflection surface.

3. The substrate according to claim 2, wherein the reflection prevention film is arranged on the first and second reflection surfaces.

4. The substrate according to claim 2, wherein the reflection prevention film is arranged on only the second reflection surface.

5. The substrate according to claim 1, wherein the metal layer is spaced by a gap from a through hole connected to the reflection electrodes.

6. A reflection type liquid crystal display apparatus comprising:
   a substrate for use in the reflection type liquid crystal display apparatus according to claim 1;
   a transparent substrate disposed in opposition to the substrate for use in the reflection type liquid crystal display apparatus; and
   a liquid crystal disposed between the transparent substrate and the substrate for use in the reflection type liquid crystal display apparatus.

7. A liquid crystal projector apparatus comprising one or more of the reflection type liquid crystal display apparatuses according to claim 6.

8. A substrate, for use in a reflection type liquid crystal display apparatus, including a semiconductor substrate placed in opposition to a transparent substrate sandwiching a liquid crystal therebetween to form the reflection type liquid crystal display apparatus comprising:
   a plurality of reflection electrodes arranged on an upper side of the semiconductor substrate in opposition to the transparent substrate; and
   a metal layer placed between the semiconductor substrate and the reflection electrodes, so as to reflect a light back incident through a gap between the reflection electrodes from the upper side of the semiconductor substrate toward the same upper side,
   wherein the metal layer has a concave portion in a region corresponding to the gap between the reflection electrodes, and
   wherein a distance between a reflection surface of the metal layer except for the concave portion and the reflection electrode is shorter than a wavelength range of the incident light, and a distance between a reflection surface of the concave portion and a reflection surface of the reflection electrode is longer than a wavelength range of the incident light.

9. A substrate, for use in a reflection type liquid crystal display apparatus, including a semiconductor substrate placed in opposition to a transparent substrate sandwiching a liquid crystal therebetween to form the reflection type liquid crystal display apparatus comprising:
   a plurality of reflection electrodes arranged on an upper side of the semiconductor substrate in opposition to the transparent substrate; and
   a metal layer placed between the semiconductor substrate and the reflection electrodes, so as to reflect a light back incident through a gap between the reflection electrodes from the upper side of the semiconductor substrate toward the same upper side,
   wherein the metal layer has a first reflection surface at a region corresponding to the gap and a second reflection surface being flat at a region except for the region corresponding to the gap, and the first reflection surface is placed closer to the semiconductor substrate than the second reflection surface, and
   wherein a reflection prevention film is arranged on only the second reflection surface of the metal layer.

10. The substrate according to claim 9, wherein a distance between the second reflection surface and the reflection electrode is shorter than a wavelength range of the incident light, and a distance between the first reflection surface and a reflection surface of the reflection electrode is longer than a wavelength range of the incident light.

11. The substrate according to claim 9, wherein the metal layer is spaced by a gap from a through hole connected to the reflection electrodes.

12. A reflection type liquid crystal display apparatus comprising:
   a substrate for use in the reflection type liquid crystal display apparatus according to claim 9;
   a transparent substrate disposed in opposition to the substrate for use in the reflection type liquid crystal display apparatus; and
   a liquid crystal disposed between the transparent substrate and the substrate for use in the reflection type liquid crystal display apparatus.

13. A liquid crystal projector apparatus comprising one or more of the reflection type liquid crystal display apparatuses according to claim 12.

14. A substrate, for use in a reflection type liquid crystal display apparatus, including a semiconductor substrate placed in opposition to a transparent substrate sandwiching a liquid crystal therebetween to form the reflection type liquid crystal display apparatus comprising:
   a plurality of reflection electrodes arranged on an upper side of the semiconductor substrate in opposition to the transparent substrate; and
   a metal layer placed between the semiconductor substrate and the reflection electrode, so as to reflect a light back incident through a gap between the reflection electrodes from the upper side of the semiconductor substrate toward the same upper side,
   wherein the metal layer has a concave portion in a region corresponding to the gap between the reflection electrodes, and
   wherein a reflection prevention film is arranged on only a reflection surface of the metal layer except for the concave portion.

* * * * *